United States Patent
Serban

(10) Patent No.: US 8,184,106 B2
(45) Date of Patent: May 22, 2012

(54) POSITION DETECTION DEVICE

(75) Inventor: Bogdan Serban, Leudelange (LU)

(73) Assignee: IEE International Electronics & Engineering S.A., Echternach (LU)

( * ) Notice: Subject to any disclaimer, the term of this patent is extended or adjusted under 35 U.S.C. 154(b) by 1964 days.

(21) Appl. No.: 10/553,657

(22) PCT Filed: Apr. 13, 2004

(86) PCT No.: PCT/EP2004/050511
§ 371 (c)(1), (2), (4) Date: Oct. 14, 2005

(87) PCT Pub. No.: WO2004/092940
PCT Pub. Date: Oct. 28, 2004

(65) Prior Publication Data
US 2006/0209050 A1    Sep. 21, 2006

(30) Foreign Application Priority Data
Apr. 16, 2003   (EP) ..................................... 03101043

(51) Int. Cl.
*G06F 3/045* (2006.01)
(52) U.S. Cl. ........................................................ 345/174
(58) Field of Classification Search .......... 345/173–178; 178/18.05
See application file for complete search history.

(56) References Cited

U.S. PATENT DOCUMENTS

| | | | |
|---|---|---|---|
| 3,806,912 A | | 4/1974 | Eckert |
| 4,517,546 A * | | 5/1985 | Kakuhashi et al. ............ 338/320 |
| 4,571,577 A | | 2/1986 | Taupin et al. |
| 4,700,022 A * | | 10/1987 | Salvador et al. ............ 178/20.03 |
| 4,798,919 A * | | 1/1989 | Miessler et al. ............ 178/18.05 |
| 4,810,992 A | | 3/1989 | Eventoff |
| 5,159,159 A | | 10/1992 | Asher |
| 5,543,589 A * | | 8/1996 | Buchana et al. ............ 178/18.03 |
| 5,818,430 A * | | 10/1998 | Heiser ............................ 345/174 |
| 2006/0158433 A1* | | 7/2006 | Serban et al. .................. 345/168 |

OTHER PUBLICATIONS

U.S. Appl. No. 10/535,399, filed May 18, 2005, Serban et al.

* cited by examiner

*Primary Examiner* — Chanh Nguyen
*Assistant Examiner* — Robert Stone
(74) *Attorney, Agent, or Firm* — Oblon, Spivak, McClelland, Maier & Neustadt, L.L.P.

(57) ABSTRACT

A position detection device including a substrate; a first ohmic resistor applied to the substrate and extending along an active surface of the position detector, whereby the first ohmic resistor is connected between a first terminal and a second terminal of the position detection device; a plurality of electric conductors connected to the first ohmic resistor at places that are distinct therefrom, the electric conductors extending from the first ohmic resistor inside the active surface alternating between the first electric conductors, whereby one first end of the conductor elements is connected to a third terminal of the position detection device. The conductor elements are configured as ohmic resistors extending through the active surface of the device and a second end of the conductor elements is connected to a fourth terminal of the position detection device.

16 Claims, 2 Drawing Sheets

POSITION DETECTION DEVICE

INTRODUCTION

Figure 1:
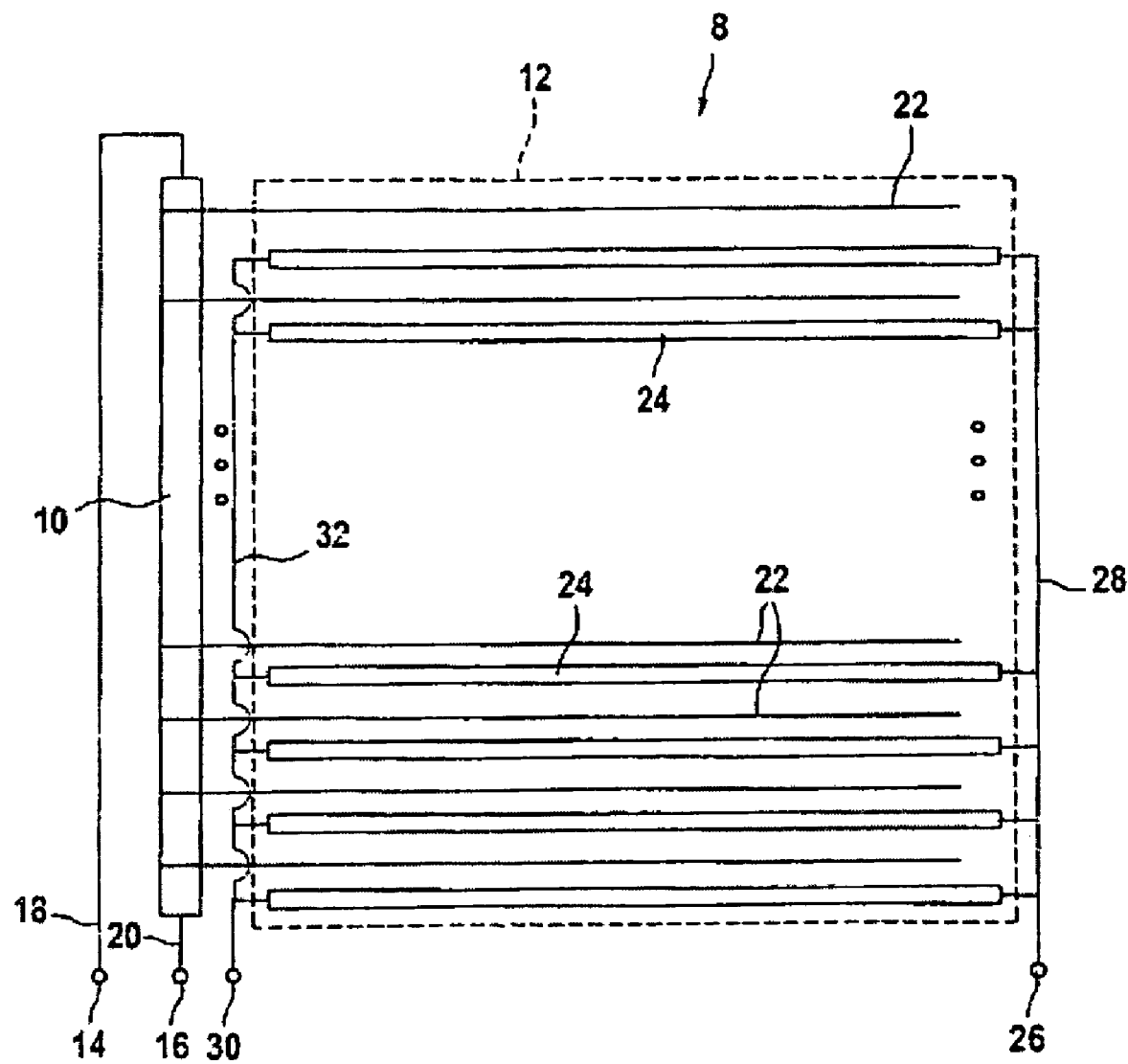

The present invention relates in general to a device for detecting a position where a force acts and, where appropriate, the intensity of this force.

It is known to construct devices for detecting a position where a force acts on the basis of sheet switches. A sheet switch comprises two support sheets, which are held a certain distance apart using a spacer. The spacer includes at least one recess that defines an active region of the switch, in which the two support sheets face each other. Inside this active region, at least two electrodes are arranged on the support sheets in such a way that an electrical contact is established between the electrodes when the two support sheets are pressed together through the effect of a force acting on the switch.

Depending on the application, a layer of semiconductor material may be placed between the electrodes, in such a way that the switch exhibits pressure-sensitive behavior, that is to say its resistance varies with the force applied. The variable nature of the electrical resistance of such switches, which are known as force-sensing resistors, allows these switches to be used as pressure sensors. The layer of semiconductor material may comprise either a material whose internal electrical resistance varies with the compression or deformation of the layer or a material whose surface structure gives the layer a certain surface resistance which, when the layer is applied against a conducting surface of the electrode, can be reduced as a result of an increase in the number of points of contact with this conducting surface through the effect of a localized pressure.

Position detectors that include an XYZ digitizing tablet, that is to say detectors of the position and the intensity of a force, have been presented using this sheet-type pressure sensor technology. These digitizing tablets use pressure sensors configured as a linear potentiometer so as to determine the point of action of a force. For this purpose, each of the pressure sensors comprises a linear resistor placed on a support, a voltage being applied across the terminals of this resistor so as to create a potential gradient. Conducting lines running laterally are connected at regular intervals to said linear resistor. The cursor of the potentiometer is formed by a conductor in the form of a comb whose teeth extend between the conducting lines. By short-circuiting the conducting lines with the teeth of the conductor at a certain point, the conductor is subjected to a voltage that varies linearly with the position of the conducting line on the linear resistor. Such a pressure sensor therefore makes it possible to determine the position along the direction of the linear resistor where a force is acting.

By superposing two of these force sensors in such a way that their respective linear resistors are oriented so as to make an angle of, for example, 90° between them, a position detector is created for identifying the position in an X-Y reference frame where a force is acting on a surface. In such a keypad, each of the two potentiometric force sensors requires three connections, namely one connection to each of the two terminals of the linear resistor and one connection for the cursor. It follows that such a keypad is limited to a relatively restricted number of connections to the outside, namely 6 connections.

Now, since the position detector is constructed by superposing two unidirectional position sensors, these 6 terminals are located on two different substrates. This fact creates problems, especially when connecting the force detector to a printed circuit for example. This is because it is necessary to use special connectors to ensure reliable connection of the terminals located on the two substrates. In addition, to produce such a sensor requires strict tolerances during assembly, so that the two layers are correctly positioned with respect to each other. Only by precise positioning can it be guaranteed that the terminals are positioned correctly so as to allow reliable connection of the detector.

OBJECT OF THE INVENTION

The object of the present invention is to propose a position detector that does not have this disadvantage.

GENERAL DESCRIPTION OF THE INVENTION

According to the invention, this objective is achieved by a position detection device that includes:

a first substrate;

a first ohmic resistor applied to said substrate and extending along an active surface of said position detector, said first ohmic resistor being connected between first and second terminals of said position detection device;

a plurality of electrical conductors, said electrical conductors being connected to the first ohmic resistor at discrete points thereon and said electrical conductors extending from the first ohmic resistor within the active surface; and a plurality of conducting elements, said conducting elements being arranged, within said active surface, so as to alternate between said first electrical conductors, a first end of said conducting elements being connected to a third terminal of said position detection device. According to the invention, said conducting elements are configured as an ohmic resistor extending over the active surface of the device and a second end of said conducting elements is connected to a fourth terminal of said position detection device.

In the position detection device according to the invention, the conductors and resistors needed to detect a position along the two directions of a plane are integrated into a single substrate. A second substrate, which would be placed facing the conductors and resistors, must contain only an activation layer designed to contact the electrical conductors and conducting elements locally at the point where a force is acting on the position detector.

When a force acts in the active surface of the detector on a second substrate, the activation layer is pressed locally against the electrical conductor/conducting element structure. Thus, at least one electrical conductor is brought into contact with a neighboring conducting element via the activation layer.

By applying an electrical voltage between the first and second terminals, that is to say across the terminals of the first ohmic resistor, this conducting element is subjected to a voltage that depends on the potential gradient created across the ohmic resistor and therefore on the position where the force is acting along the direction defined by the ohmic resistor. This voltage may then be measured on the third and fourth terminals, which are preferably connected together in this method of operation.

In a second step, an electrical voltage is applied between the third and fourth terminal so as to create a potential gradient across the conducting elements that are configured in the form of ohmic resistors. The electrical conductor contacted at the point where the force acts is therefore subjected to an electrical voltage that depends on the position where the force is acting along the direction defined by the conducting elements. This voltage may in turn be measured on the first and second terminals.

By alternating the measurements in the two opposing directions, it is thus easily possible to detect the position where a force is acting in the plane defined by the two directions of the ohmic resistors and therefore to determine the X-Y coordinates of a point of action of a force. Henceforth it is therefore possible to determine the coordinates X and Y of the point of action of a force using a position detector that now requires only 4 terminals so as to connect it to an associated measurement circuit. It follows that the connection of the position detector is considerably simplified.

In addition, all the electrical terminals of the detector needed to connect it are located on a single substrate, which considerably facilitates the connection of the detector, especially to a printed circuit. This is because it is consequently possible to use standard crimping connectors to ensure reliable contact between the position detector and an associated measurement circuit.

Furthermore, the fact that all the terminals are arranged on a single substrate reduces the cost of producing the position detector. This is because, since a second substrate now contains only the activation layer, the tolerances on the assembly of the two substrates by lamination are much less stringent than in the case of conventional position detectors. Consequently, the manufacture of products that do not meet the specifications is thereby considerably reduced. The tolerances on the position of the various terminals now depend only on the method of application of the various conductors. This application is often carried out using a screen printing method, which is very well controlled. The printing accuracy and the very strict tolerances associated therewith even make it possible to reduce the distance between the various terminals, consequently allowing the use of smaller connectors having a finer spacing or pitch.

Lastly, the testing of the detectors produced is simplified by the fact that all the points of contact lie in one and the same plane.

In one possible embodiment of the invention, the first substrate comprises an elastic support sheet. This embodiment results in a flexible position detector. In another embodiment, the first substrate comprises a printed circuit board. This latter embodiment is made possible only by the fact that all the terminals are placed on the same substrate. The conductors and resistors of the position detector, which serves for example as a tactile data input device, can therefore be printed directly on the measurement circuit or operating circuit. Subsequent connection of the detector and of its associated circuit is therefore no longer required.

It should be noted that, apart from the wide range of flexible or rigid substrates that can be used, the present position detector can be produced in a wide variety of shapes, matched to the specific use of the detector. Thus, the active surface may for example have a generally circular, rectangular or other shape.

In an advantageous embodiment of the invention, said conducting elements are made of the same material as said electrical conductors. The conducting elements, the electrical conductors and the ohmic resistor are for example configured as carbon film resistors. The specific resistance of the various elements is in this case adapted by the graphite printing thickness in the various regions. It is thus possible to produce structures having very different electrical characteristics with the same material. This embodiment has the advantage of limiting the material used in the production of position detectors and thereby minimizing the number of printing steps needed.

In a first step, the ohmic resistor is for example printed, the electrical conductors extending from the ohmic resistor and the conducting elements. The resistances of the various elements are adapted during this step, by varying the thickness of the printed graphite layer. Next, in a second step, a dielectric material is printed at the points where the conductor(s) connecting the conducting elements to their terminals will have to cross the electrical conductors. Finally, the conductors connecting the various elements to their respective terminals are printed in a third printing step. For example, these conductors are printed silver conductors. Consequently, all the functional elements of the first substrate can be manufactured in a printing process that requires only three steps.

The activation layer may comprise a single conducting layer, which allows contact between the electrical conductors and the conducting elements. In this case, the intensity of the force acting on the position detector cannot be determined. To allow both the point of action and the intensity of the force to be detected, the second substrate preferably comprises a layer made of resistive or semiconductor material applied to said second substrate, which is pressure-sensitive. Said second substrate, preferably an elastic support sheet, is placed on top of the first substrate in such a way that said layer of resistive or semiconductor material faces said electrical conductors and conducting elements within the active surface. In this case, the resistance between the electrical conductor and the conducting element is dependent on the intensity with which the activation layer is pressed onto the conductors. By measuring this resistance it is therefore possible to determine the intensity of the force supplied.

It should be noted that the position detector of the present invention can be used to produce all kinds of input devices such as, for example keypads, touchpads or joystick functions. In one advantageous embodiment of the invention, the position detector includes a flexible pressure-distributing layer, said pressure-distributing layer being applied to said second substrate. Such a flexible layer, for example a layer of rubber, makes it possible to implement a joystick function on a surface with an area as small as that of a fingertip.

It should be noted that the resistive and conducting layers may comprise transparent materials. Likewise, the activation layer may be manufactured from a transparent material. In this case, the present detector is very suitable for use with a touch screen.

DETAILED DESCRIPTION WITH THE AID OF FIGURES

Figure 2:
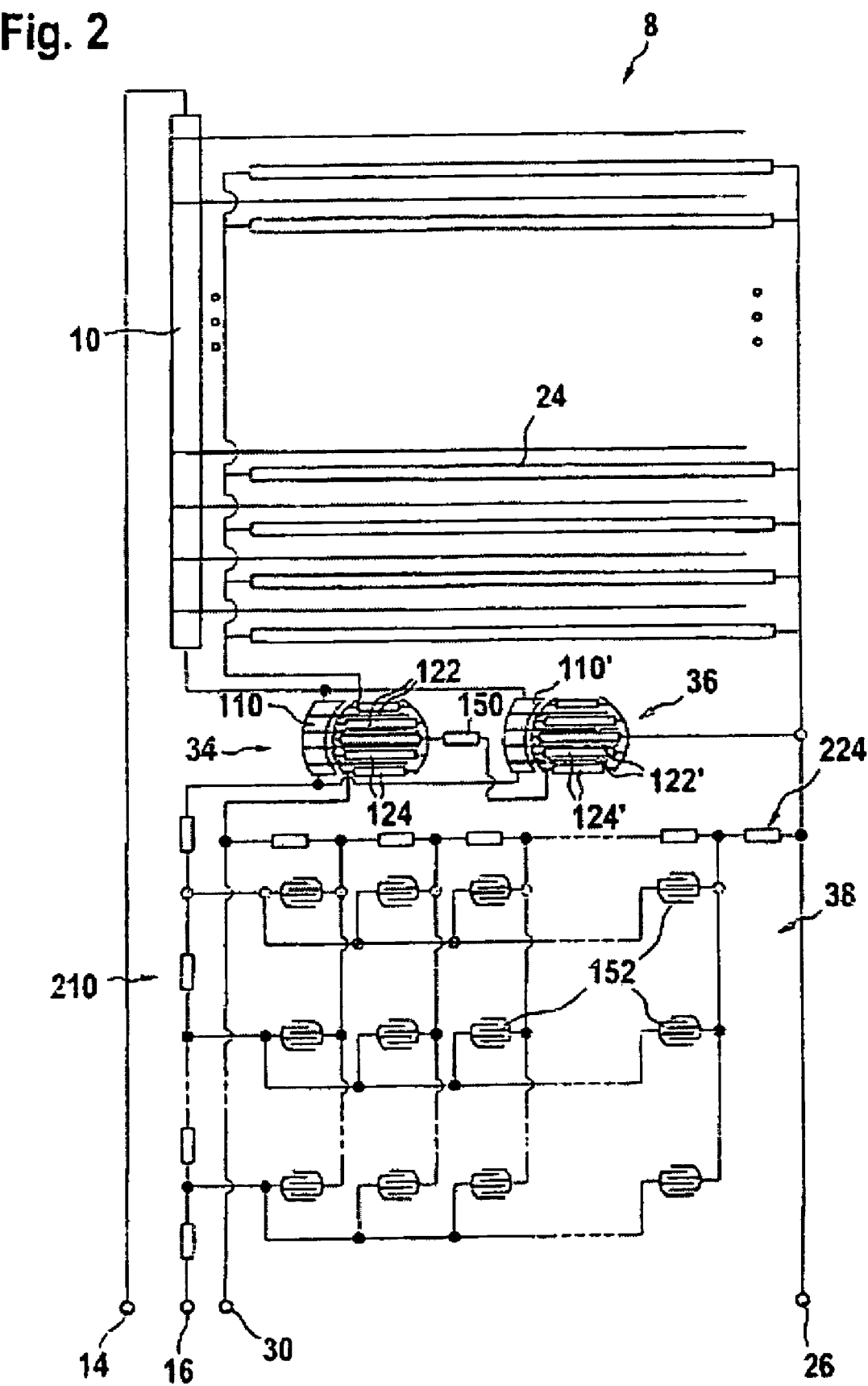

Other features and characteristics of the invention will become apparent from the detailed description of an advantageous embodiment presented below, by way of illustration, with reference to the appended figures. These show:

FIG. 1: a view of the arrangement of the conductors on the first substrate of a position detector; and FIG. 2: a view of the arrangement of the conductors on the first substrate of a data input device, comprising a position detector in touchpad form, two regions configured as a joystick, and a keypad region.

FIG. 1 shows a view of the arrangement of the conductors on the first substrate of a position detector 8. A linear ohmic resistor 10, which extends along an active surface 12 of the position detector, is placed on a substrate. In the embodiment shown, the active surface has a generally square shape. However, it should be noted that other shapes are possible, for example oval, circular, rectangular, etc.

The ohmic resistor 10 is connected between a first terminal 14 and a second terminal 16 of said position detection device via conducting lines 18, 20.

A plurality of electrical conductors 22 are connected to the first ohmic resistor 10 at discrete points thereon, the electrical conductors 22 extending from the first ohmic resistor toward the interior of the active surface 12. In the embodiment shown, the conductors 22 are distributed equidistantly and extend parallel to one another. It goes without saying that a different arrangement of conductors is possible.

A plurality of conducting elements 24 configured as ohmic resistors are arranged, within said active surface 12, so as to alternate between said first electrical conductors 22. A first end of the conducting elements 24 is connected to a third terminal 26 of said position detection device via a conducting line 28. A second end of said conducting elements 24 is connected to a fourth terminal 30 via a conducting line 32.

Alongside the ohmic resistor 10, the conducting line 32 must cross the electrical conductors 22. To avoid a false contact being established at these points, a layer of a dielectric material is preferably printed on the conductors 22 at the crossover points.

It should be noted that the resolution of the position detector depends to a large extent on the distance between the electrical conductors and the neighboring conducting elements. By varying the number of conductors and conducting elements, it is consequently possible to adapt the resolution of the detector to its specific application.

FIG. 2 shows an arrangement of the conductors on the first substrate of a combined data input device. This data input device comprises a position detector 8, for example configured as a touchpad as shown in FIG. 1, two regions 34 and 36 configured in the form of a joystick, and an adjacent region configured as a keypad 38.

The joystick regions 34, 36 each time comprise an embodiment of a position detector according to the invention with an ohmic resistor 110 and 110' extending along an active surface (of circular shape), a plurality of electrical conductors 122, 122', which are connected to the ohmic resistor 110, 110' respectively, at discrete points thereon, and a plurality of conducting elements 124, 124' configured as ohmic resistors, which are arranged so as to alternate between said electrical conductors 122, 122', respectively. It should be noted that the two ohmic resistors 110 and 110' are connected in parallel and this parallel arrangement of the two resistors is connected in series with the ohmic resistor 10 between the terminals 14 and 16 of the data input device. In addition, the two groups of conducting elements 124 and 124' are connected in series via an additional resistor 150 and this series arrangement is connected in parallel with the conducting elements 24 between the third and fourth terminals 26 and 30 of the device. Thus, the combination of a touchpad and joystick regions is possible without increasing the number of terminals of the device.

To configure the regions 34 and 36 as joysticks, a flexible pressure-distributing layer, for example a layer of rubber, is applied to the second substrate (not shown). Such a distributing layer makes it possible to change the point of action of an activation force exerted for example by a finger, simply by reaching the finger onto the respective region.

The keypad 38 comprises a plurality of discrete activation regions 152, which are arranged in a "matrix" consisting of several rows and columns. An active key of the keypad may be associated with each of these activation regions.

Each of the activation regions 152 comprises two comb-shaped electrode structures 154, 156 that are placed so that the fingers of one of the comb-shaped structures are intercalated at a certain distance with the figures of the other structure. An activation layer, which may be a simple conducting layer or else a pressure-sensitive layer, is arranged on the second substrate (not shown) in such a way that the two structures of an activation region are short-circuited by the activation layer when a force acts on the device within the activation region.

To identify the activation region in which a force acts, the activation regions are connected with one of their electrode structures 154 over a first chain of resistors 210 and with the other electrode structure 156 over a second chain of resistors 224, the connection being made at different points on said first and second chain of resistors. By applying a potential difference across the first chain of resistors 210 and by measuring the voltage across the terminals of the second chain of resistors 224, it is possible to determine the point of contact between the electrode structures along the direction of the first chain of resistors 210 and therefore the position of the activated key. In a second step, a potential difference is applied across the second chain of resistors 224 and the voltage across the terminals of the first chain of resistors 210 is measured to thus determine the position of the activated key in the other direction.

It should be noted that the first chain of resistors 210 is connected in series with the ohmic resistor 10 and the parallel arrangement of resistors 110 and 110' between the two terminals 14 and 16 of the data input device. Likewise, the chain of resistors 224 is connected in parallel with the conducting elements 24 and the series arrangement of the conducting elements 124 and 124' between the terminals 26 and 30. Thus, the combination, consisting of the touchpad 8, the joystick regions 34 and 36 and the keypad 38, is possible without increasing the number of terminals of the device.

It will be appreciated by a person skilled in the art that each of the chains of discrete resistors 210 and 224 may be replaced with an extended ohmic resistor, such as the resistor 10, without the operation of the device being modified.

The invention claimed is:

1. A position detection device, comprising:
a first substrate;
a first ohmic resistor applied to said first substrate and extending along an active surface of said position detector, said first ohmic resistor connected between first and second terminals of said position detection device;
a plurality of electrical conductors connected to the first ohmic resistor at discrete points thereon and said electrical conductors extending from the first ohmic resistor within the active surface; and
a plurality of conducting elements arranged, within said active surface, so as to alternate between said electrical conductors, a first end of said conducting elements being connected to a third terminal of said position detection device;
wherein said conducting elements are configured as an ohmic resistor extending over the active surface of the device and a second end of said conducting elements is connected to a fourth terminal of said position detection device.

2. The device as claimed in claim 1, wherein the first substrate comprises an elastic support sheet.

3. The device as claimed in claim 1, wherein the first substrate comprises a printed circuit board.

4. The device as claimed in claim 1, wherein said conducting elements are made of a same material as said electrical conductors.

5. The device as claimed in claim 1, further comprising a second substrate and a layer made of resistive or semiconductor material applied to said second substrate, said second substrate being arranged on top of the first substrate such that said layer of resistive or semiconductor material faces said electrical conductors and conducting elements within the active surface.

6. The device as claimed in claim 5, wherein said second substrate comprises an elastic support sheet.

7. The device as claimed in claim 5, further comprising a pressure-distributing layer applied to said second substrate.

8. A data input device including a position detection device, said position detection device comprising:
   a first substrate;
   a first ohmic resistor applied to said first substrate and extending along an active surface of said position detector, said first ohmic resistor connected between first and second terminals of said position detection device;
   a plurality of electrical conductors connected to the first ohmic resistor at discrete points thereon and said electrical conductors extending from the first ohmic resistor within the active surface; and
   a plurality of conducting elements arranged, within said active surface, so as to alternate between said electrical conductors, a first end of said conducting elements being connected to a third terminal of said position detection device;
   wherein said conducting elements are configured as an ohmic resistor extending over the active surface of the device and a second end of said conducting elements is connected to a fourth terminal of said position detection device.

9. A position detection device having an active surface and at least a first and a second terminal, said position detector comprising:
   a first substrate;
   a first ohmic resistor applied to said first substrate and extending along said active surface, said first ohmic resistor being connected between said first and second terminals;
   a plurality of electrical conductors connected to the first ohmic resistor at discrete points thereon and said electrical conductors extending from the first ohmic resistor within the active surface; and
   a plurality of conducting elements arranged, within said active surface, between said electrical conductors so as to alternate with said first electrical conductors, a first end of said conducting elements being connected to a third terminal of said position detection device;
   wherein said conducting elements are configured as an ohmic resistor extending over the active surface of the device and a second end of said conducting elements is connected to a fourth terminal of said position detection device.

10. The device as claimed in claim 9, wherein the first substrate comprises an elastic support sheet.

11. The device as claimed in claim 9, wherein the first substrate comprises a printed circuit board.

12. The device as claimed in claim 9, wherein said conducting elements are made of a same material as said electrical conductors.

13. The device as claimed in claim 9, further comprising a second substrate and a layer made of resistive or semiconductor material applied to said second substrate, said second substrate being arranged on top of the first substrate such that said layer of resistive or semiconductor material faces said electrical conductors and conducting elements within the active surface.

14. The device as claimed in claim 13, wherein said second substrate comprises an elastic support sheet.

15. The device as claimed in claim 13, further comprising a pressure-distributing layer, applied to said second substrate.

16. A data input device including a position detection device having an active surface and at least a first and a second terminal, said position detection device comprising:
   a first substrate;
   a first ohmic resistor applied to said first substrate and extending along said active surface, said first ohmic resistor being connected between said first and second terminals;
   a plurality of electrical conductors connected to the first ohmic resistor at discrete points thereon and said electrical conductors extending from the first ohmic resistor within the active surface; and
   a plurality of conducting elements arranged, within said active surface, between said electrical conductors so as to alternate with said electrical conductors, a first end of said conducting elements being connected to a third terminal of said position detection device;
   wherein said conducting elements are configured as an ohmic resistor extending over the active surface of the device and a second end of said conducting elements is connected to a fourth terminal of said position detection device.

* * * * *